United States Patent
Yamada et al.

(10) Patent No.: US 6,240,899 B1
(45) Date of Patent: Jun. 5, 2001

(54) THROTTLE VALVE DEVICE FOR AN INTERNAL COMBUSTION ENGINE

(75) Inventors: Hiroyuki Yamada; Yasuhiro Kamimura; Kenji Ono; Norihiro Isozaki, all of Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/283,963

(22) Filed: Apr. 2, 1999

Related U.S. Application Data

(62) Division of application No. 08/922,318, filed on Sep. 3, 1997, now Pat. No. 5,975,051.

(30) Foreign Application Priority Data

Sep. 3, 1996 (JP) .................................................. 8-232788

(51) Int. Cl.$^7$ ........................................................ F02D 9/02
(52) U.S. Cl. ............................................ 123/396; 123/399
(58) Field of Search ................................... 123/361, 399, 123/396

(56) References Cited

U.S. PATENT DOCUMENTS

| | | | |
|---|---|---|---|
| 4,735,179 | 4/1988 | Ejiri et al. ............................ | 123/332 |
| 4,947,815 | 8/1990 | Peter ..................................... | 123/399 |
| 5,092,296 | * 3/1992 | Gunter et al. ..................... | 123/339 X |
| 5,161,508 | * 11/1992 | Zentgraf et al. ................ | 123/339.25 |
| 5,735,243 | 4/1998 | Asai et al. ........................... | 123/396 |
| 5,752,484 | 5/1998 | Apel et al. ........................... | 123/396 |

FOREIGN PATENT DOCUMENTS

| | | | |
|---|---|---|---|
| 63-150449 | 6/1988 | (JP) . | |
| 1-117946 | * 5/1989 | (JP) ..................................... | 123/399 |
| 6-137172 | * 5/1994 | (JP) ..................................... | 123/399 |
| 95/35440 | * 12/1995 | (WO) .................................. | 123/399 |

* cited by examiner

Primary Examiner—Tony M. Argenbright
(74) Attorney, Agent, or Firm—Evenson, McKeown, Edwards & Lenahan, P.L.L.C.

(57) ABSTRACT

A motor-driven throttle valve control device has a main body in which an air intake path is formed. The throttle valve is secured on a rotatable shaft supported by the main body. An electric motor drives the throttle valve through a gear mechanism. A throttle valve sensor is provided to detect the valve opening angle. Default and return springs are provided to bias the throttle valve. The main body includes a cover at one end of the throttle shaft. The gear mechanism, angle sensor and default and return springs are located between the cover and the main body of the throttle valve device.

2 Claims, 11 Drawing Sheets

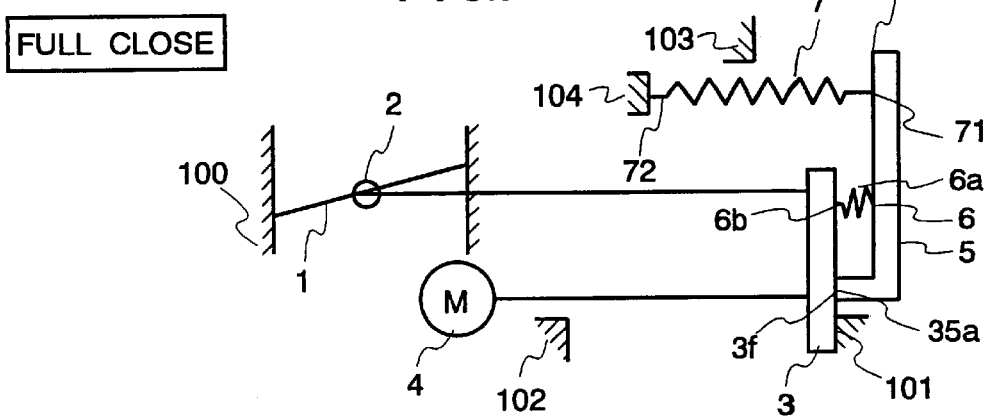
FIG. 1A FULL CLOSE
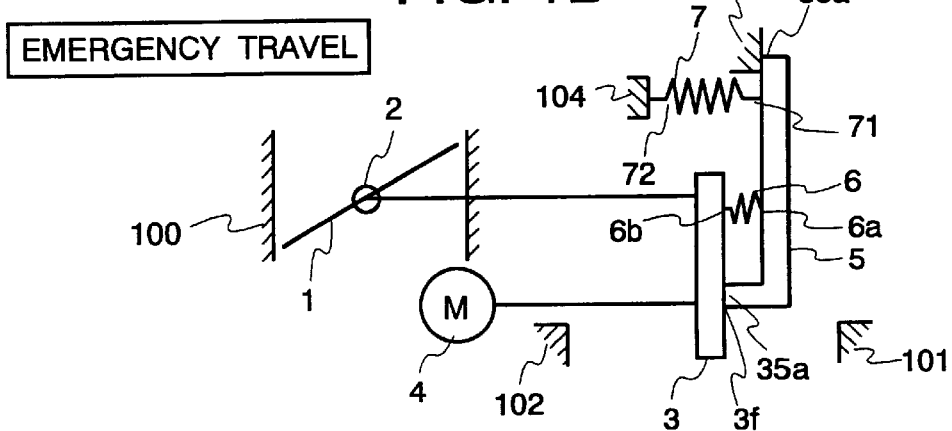
FIG. 1B EMERGENCY TRAVEL
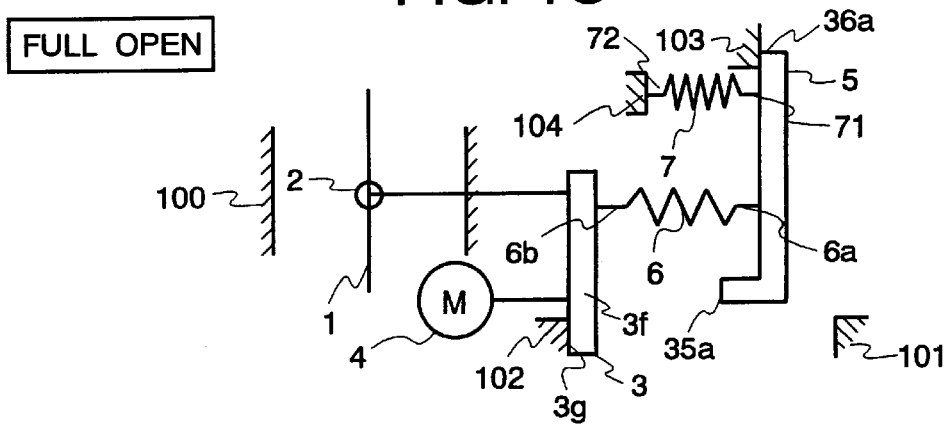
FIG. 1C FULL OPEN
OPEN ←——→ CLOSE

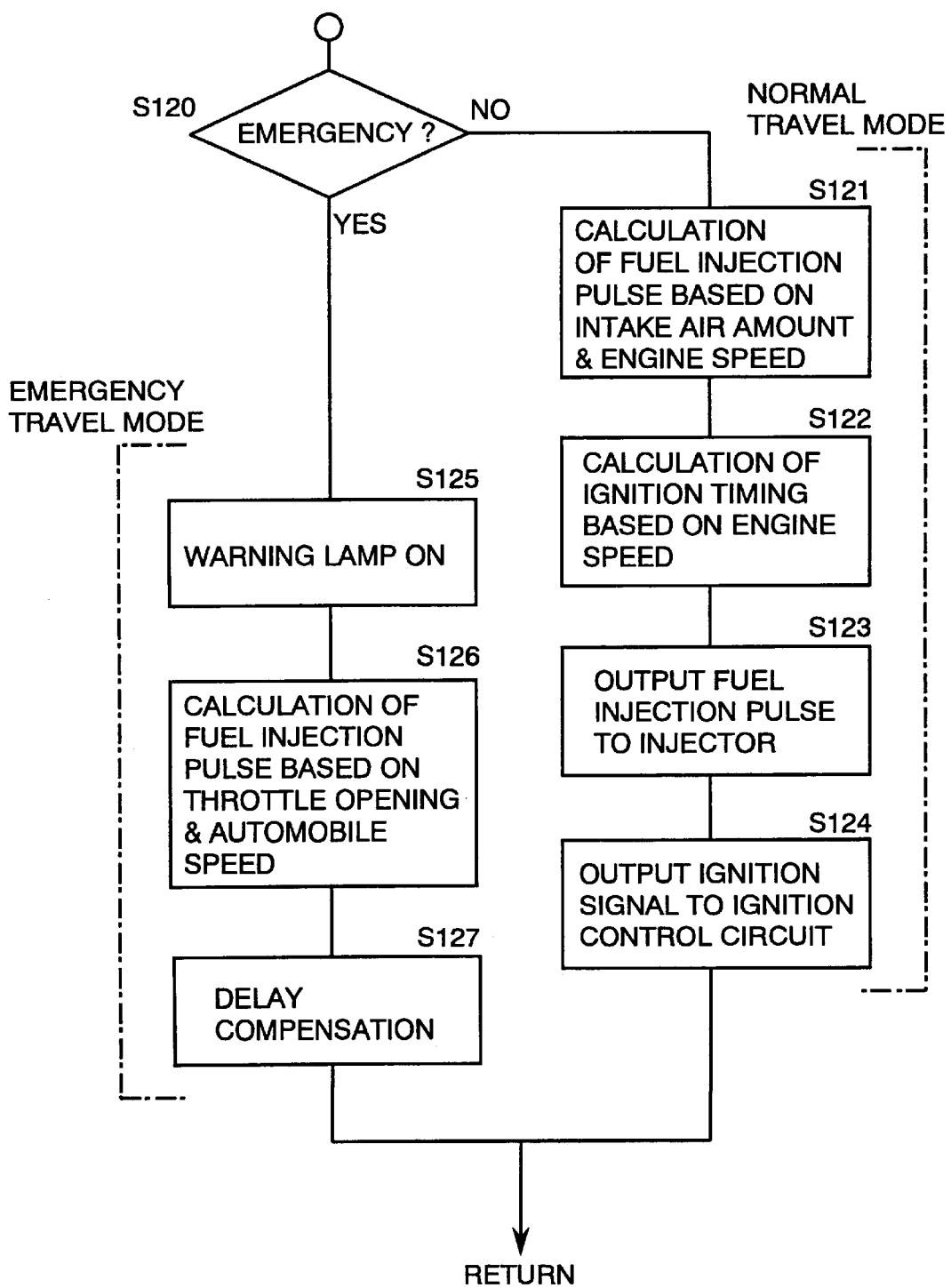

THROTTLE VALVE DEVICE FOR AN INTERNAL COMBUSTION ENGINE

This application is a division of application Ser. No. 08/922,318, filed Sep. 3, 1997, now U.S. Pat. No. 5,975,051.

BACKGROUND OF THE INVENTION

The present invention relates to a throttle valve control device for an internal combustion engine, and more particularly to a throttle valve control device with a motor-driven throttle valve.

A conventional throttle valve control device is disclosed in JP-A-63-150449 (1988), and U.S. Pat. Nos. 4,947,815 and 4,735,179 (the last one being owned by the same assignee as this application).

As discussed in the above documents, one of the most important things in a throttle valve device driven by an actuator, such as a DC motor or a step motor, is that the minimum safety can be secured even against a fault in the actuator.

With the aforesaid "minimum safety", the following is meant; i.e., even in the event of occurrence of a fault in a throttle valve actuator, an engine can produce torque of a certain magnitude, whereby an automobile can travel at a predetermined speed, e.g. 30 km/h or so, to reach a nearby repair shop. According to circumstances, however, the higher speed, e.g., 80 km/h, may be required for such an emergency speed. That is, it is desired that, even in the event of occurrence of a fault in a throttle valve actuator, a throttle valve is always kept at a certain opening so that an engine can produce torque large enough to allow an automobile to travel at a desired emergency speed.

By way of example, assume a case where electric power for a throttle valve actuator is abruptly cut off. In such a case, a throttle valve is rapidly returned by a return spring to a full close position or an idle position, with the result that a traveling automobile is decelerated drastically.

Further, with respect to ~a full close position" and "an idle position", more detailed explanation will be given below in relation to the description of the embodiment of the present invention. For the present, however, only "a full close position (or opening)" is used.

Then, after the throttle valve is returned to the full close position, the automobile can no longer continue to travel at a desirable speed, because the engine can not produce sufficient torque with such opening of the throttle valve.

Further, in an motor-driven throttle valve device, an initial position of a throttle valve when an engine does not operate, i.e., a full close position, is necessary to be selected at such a value that re-start torque of a driving motor never becomes large. The reason therefor is as follows.

If the throttle valve is allowed to stand at the full close position for a long period of time after the engine stops, combustion products, such as tar and carbon, accumulate and adhere between the throttle valve and an inner wall of an intake pipe so that the throttle valve is fixed to the inner wall and experiences difficulty in being opened again by the torque of the driving motor.

Therefore, the conventional throttle valve device was provided with a stopper called a default stopper. This stopper serves to prevent a throttle valve from being at the full close position, when a fault occurs in the driving motor and the throttle valve is rotated by a return spring in the closing direction.

Therefore, the default stopper is different in its function from a stopper called a full close stopper (or an idle stopper), which is provided at a certain position to prevent a throttle valve from sticking into an inner wall of an intake pipe to secure a rotational speed for idling.

Even if a driver releases his foot from an acceleration pedal to temporarily stop an automobile because of a traffic signal, the throttle valve must be slightly opened to keep a rotational speed for idling so that the engine is prevented from stalling. With such a rotational speed of the engine, however, an automobile can never travel at the speed of 30 km/h, for example.

As already mentioned, in order to attain the aforesaid minimum safety, an automobile is required to be able to still travel at a desired emergency speed, even if a throttle valve driving motor has a fault. Usually, a full close stopper (or idle stopper) is provided at the position of 1°~2° prior to the completely closed position of a throttle valve. Here, it is meant with the "completely. closed position" of a throttle valve that the throttle valve completely chokes an intake pipe so as to block all air flow therethrough.

On the other hand, the default stopper is provided at the position that is further shifted by 3~11° in the opening direction from the position of the full close stopper. With the opening of the throttle valve defined by the default stopper as above, an automobile can travel at the speed of 30 to 80 km/h (the travel under such a condition as described above is often called a limp-home travel (or operation)).

Under the condition of the limp-home travel, the opening of the throttle valve is maintained at a value to attain the aforesaid minimum safety, but the opening can be no longer adjusted, even if an acceleration pedal is operated. Therefore, the control of the engine output is done by switching over a control mode of the ignition timing to one prepared for the limp-home operation, and/or by switching over a control mode of the fuel supply to one prepared for the same.

If an automobile temporarily stops because of the traffic signal, for example, the rotational speed of the engine will become very high. Namely, the engine gets into a runaway condition. This is because under the limp-home. operation, the throttle valve is kept at the opening which is much larger than that of the full close position.

Therefore, an adequate instruction for the ignition timing and/or the fuel supply must be provided so as not to cause such a runaway condition in the engine, taking account of the fact that the automobile stands still, a rotational speed of the engine, information of a fault in a throttle valve motor, and so on.

Of course, if a throttle valve motor operates normally, the default stopper is unnecessary and awkward, because desirably the motor can control the opening of a throttle valve without any limitation between the position defined by the full close stopper and the full open position, in proportion to the depression amount of an acceleration pedal.

In the prior art, this point was dealt with in the following manner. Namely, the position of a default stopper is biased by putting it on some kind of elastic body like a spring or rubber. This elastic body has the elastic force being capable of balancing with the force of a return spring, when the throttle valve is at the position defined by the default stopper. Therefore, the throttle valve is never closed further by force of the return spring only.

Then, in the conventional approach, the throttle valve device is so designed that if a throttle valve motor operates normally, a throttle valve is controlled by force to the full close position against the elastic force as described above. That is to say, the elastic body, on which the default stopper is provided, is displaced by the torque of the motor in the direction of the full close position, and the throttle valve can be closed at the full close position.

During an engine idling operation, the throttle valve motor is necessary to produce the torque overcoming the force of the elastic body, whereby the throttle valve can be rotated from the opening of 4°~13° to the opening of 1°~2°. For the throttle valve motor, therefore, force caused by the elastic body is preferably as small as possible. If the elastic force is small, the throttle valve motor can produce only the smallest torque necessary which reduces the load on a battery.

This is desirable especially during the idling operation of the engine, because a charging generator does not produce sufficient output power in that duration. Namely, the throttle valve motor must continue to produce torque in order to keep the throttle valve at the full close position or the idle position against the default spring. Therefore, it is desirable that the spring force of the default spring is as small as possible.

SUMMARY OF THE INVENTION

An object of the present invention is to provide a motor-driven throttle valve control device for an internal combustion engine, in which torque required to be produced by a throttle valve motor can be reduced by reducing torque for making the closing operation of a throttle valve starting from the position defined by a default stopper, whereby the throttle valve motor can be miniaturized and hence the electrical load against the engine is reduced.

Further, the present invention is not limited to the throttle valve control device described above where the limp-home function is attained by the electrical control. The present invention can also be used with a throttle valve where the limp-home function is performed by transmitting the depression amount of an acceleration pedal to a throttle valve through links or a wire.

According to the present invention, a return spring serves to put back a throttle valve to a default position, at which the aforesaid minimum safety can be secured. When the throttle valve moves in the closing direction from the default position, it is operably separated from the return spring and moves against force caused by a separately provided spring (default spring).

With the construction as mentioned above, a spring with weak spring force can be used as a default spring, compared with the conventional default spring, because force of the return spring acting in the closing direction does not need to be taken into consideration.

One of the embodiments according to the present invention is provided with a coupling lever, which rotates together with a throttle valve and stops at a stopper (a default stopper) provided at the default position of the throttle valve. In such an arrangement, only the throttle valve is rotated by the throttle valve motor in the opening direction from the default position. In another embodiment, the throttle valve is rotated by the throttle valve motor only in the closing direction from the default position. In every embodiment, the rotation of the coupling lever is limited by the default stopper provided at the default position.

That is, rotating torque of the throttle valve motor is transmitted to a throttle valve shaft through gears. The coupling lever is detachably coupled with the throttle valve shaft and rotates together therewith until it is caught by the default stopper. After the coupling lever and the default stopper contact with each other, only the throttle valve shaft continues to rotate.

In the one embodiment, there is provided a return spring between the coupling lever and the throttle valve.

A default spring is provided to energize the coupling lever in the direction of the default stopper. In another embodiment, a default spring is provided between the coupling lever and the throttle valve. A return spring is provided to energize the coupling lever in the direction of the default stopper.

For springs as above described, the expansion force of a contracted spring or the contracting force of a stretched spring, and the combination thereof, can be used.

In one embodiment of the invention, the return spring is preferably a spiral spring, the innermost end of which is fixed to a sleeve of the coupling lever. The sleeve is formed in a united body with the coupling lever and rotatably provided on a throttle valve shaft. The outermost end of the spiral spring is fixed to a member (a reduction gear, for example) fixedly provided on the throttle valve shaft.

Further preferably, a gear fixed on the throttle valve shaft has a flat and circular depressed space or room in a body part thereof with the throttle valve shaft centered. The spiral spring, which is usually formed flat, i.e., in a disk-like form, is accommodated in the space or room defined by the flat and circular depression. Gear teeth are formed on the outer periphery of the body part of the gear.

Furthermore, a sleeve is formed in the center of a gear. The sleeve is fitted to the throttle valve shaft to fix the gear thereon. An outer sleeve further cover the outer periphery of the sleeve rotatably. The coupling lever is fixed on the outer sleeve. An end of the default spring is supported by the coupling lever fixed on the outer sleeve.

The coupling lever is preferably provided with an arm having a surface contacting with the default stopper. Further, the coupling lever is preferably provided with an arm having a surface contacting with a member (a gear member, for example), which rotates together with the throttle valve, when the throttle valve rotates in the closing direction from the default position.

Furthermore, that member is provided with a surface contacting a stopper which defines the end of the rotation of the throttle valve in the closing direction.

In the another embodiment of the invention, a default spring is a spiral spring, the innermost end of which is fixed to a throttle valve shaft and the outermost end thereof to a coupling lever rotatably fixed on the throttle valve shaft.

Further, in this embodiment, the coupling lever preferably supports the end of the return spring, and is provided with an arm having a surface contacting the default stopper.

Preferably, the coupling lever is provided with another arm, which contacts with a member fixed on the throttle valve shaft, when the throttle valve rotates in the opening direction from the default position. The coupling lever is further provided with an arm, on which an end of the default spring is fixed.

Moreover, in each of the aforesaid embodiments of the present invention, the throttle valve never rotates under the condition that it is held at the default position, even if an acceleration pedal is operated. Under such condition, the fuel injection amount and the ignition timing are controlled by switching over the control mode to that for the minimum safety, whereby the output (rotational speed) of an engine is controlled.

BRIEF DESCRIPTION OF THE DRAWINGS

Other objects, advantages and novel features of the present invention will become apparent from the following detailed description of the invention when considered in conjunction with the accompanying drawings wherein:

FIGS. 1A to 1C are explanatory schematic views demonstrating the operational principle of an electronically controlled motor-driven throttle valve device according to a first embodiment of the present invention;

FIG. 12 is a flow chart for explaining the operation of the automobile control system shown in FIG. 11.

DESCRIPTION OF CURRENTLY PREFERRED EMBODIMENTS

Figure 2:
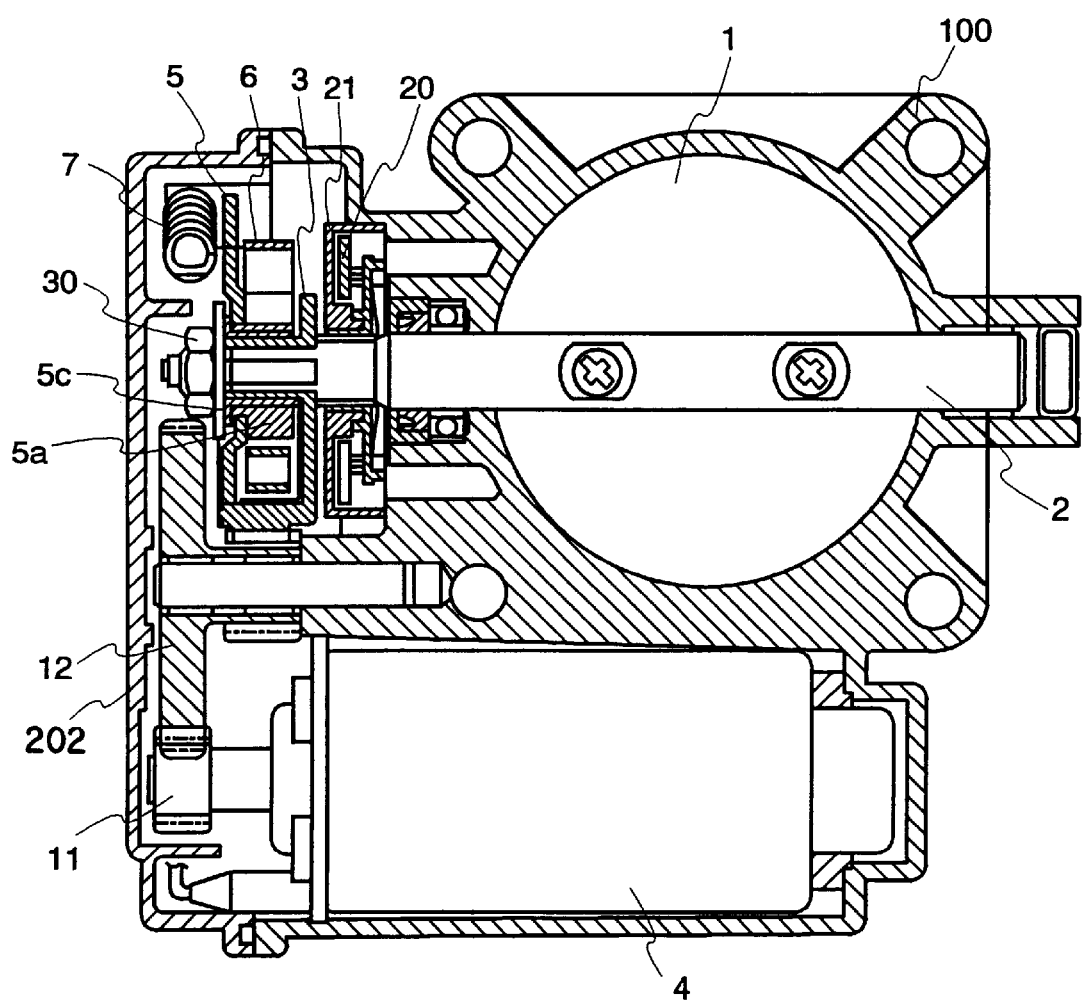
FIG. 2 is a cross-sectional view of the throttle valve device according to the first embodiment along the line intersecting an air path.
Figure 3:
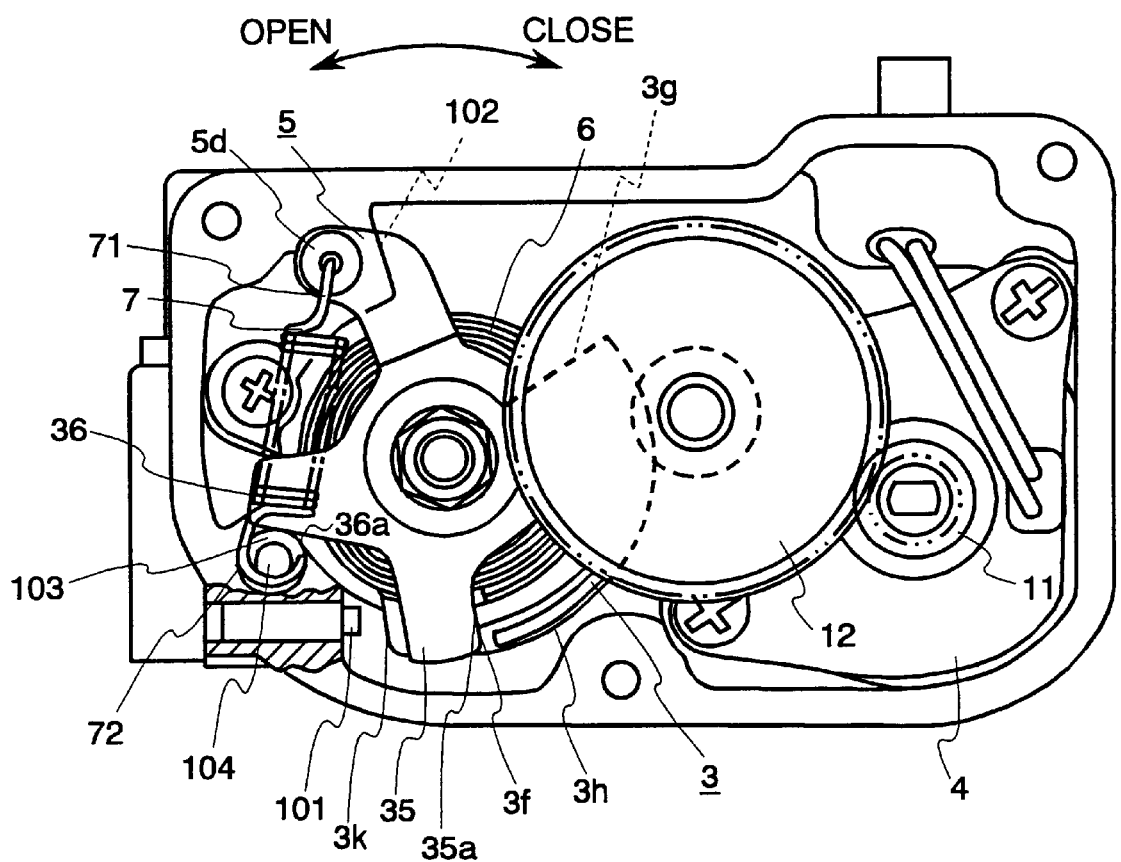
FIG. 3 is a view of the throttle valve device of FIG. 2, with an end cover removed therefrom and viewed from the left side of FIG. 2.
Figure 4:
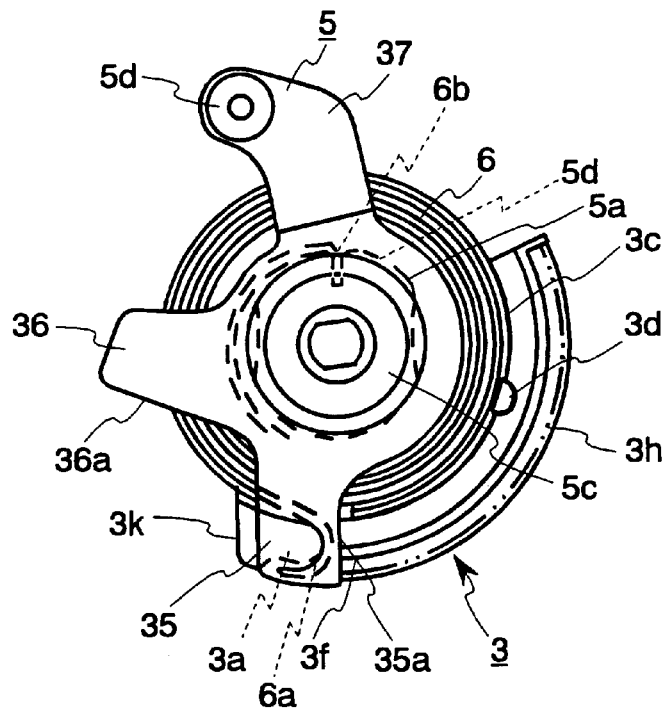
FIG. 4 is a plan view showing a subassembly composed of a driving gear and a coupling lever.
Figure 5:
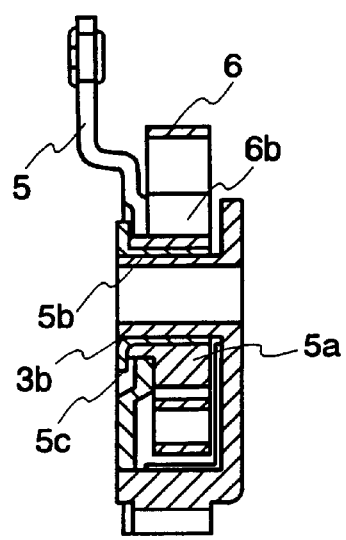
FIG. 5 is a sectional view of the subassembly shown in FIG. 4.
Figure 6A:
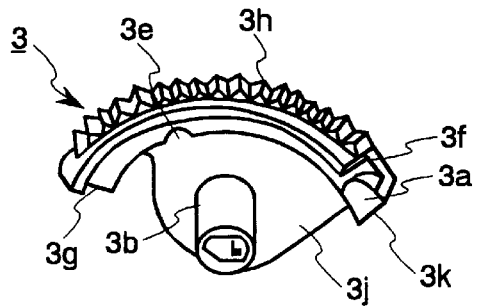
FIGS. 6A to 6D are perspective views of various parts of the subassembly shown in FIG. 4.
Figure 6B:
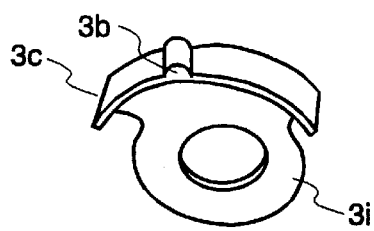
Figure 6C:
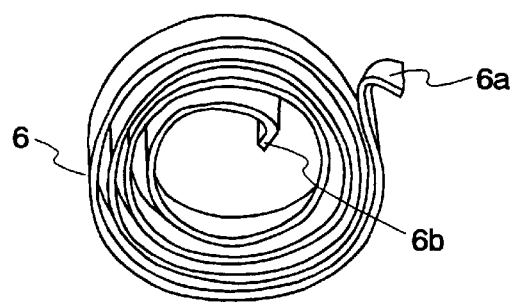
Figure 6D:
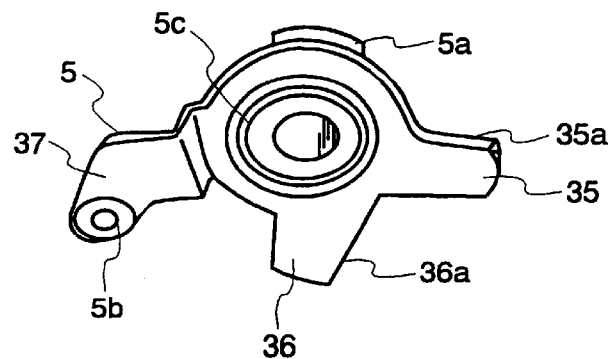
Figure 7:
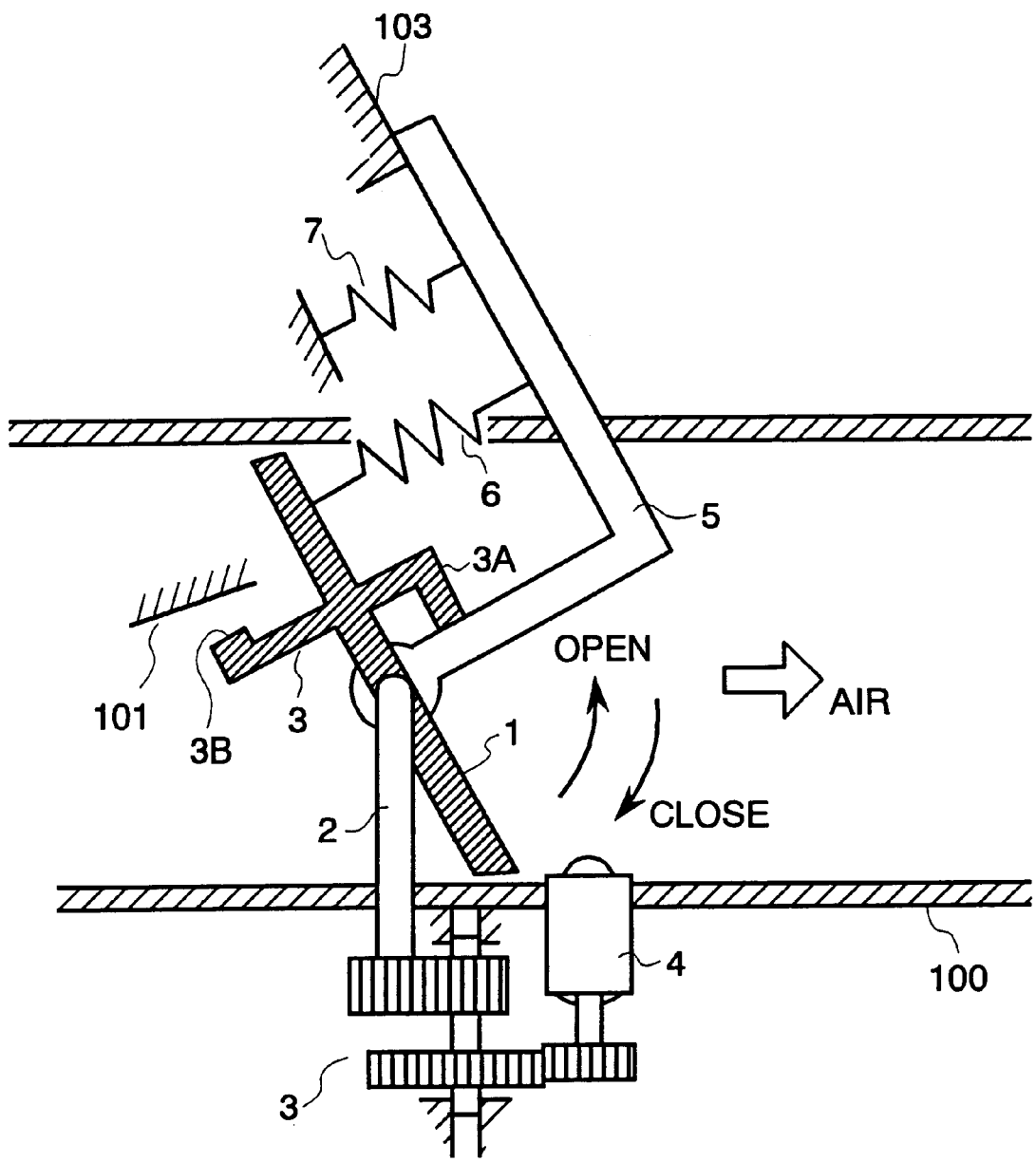
FIG. 7 is a schematic diagram for explaining the operation of the first embodiment shown in FIGS. 2–6D.
Figure 8:
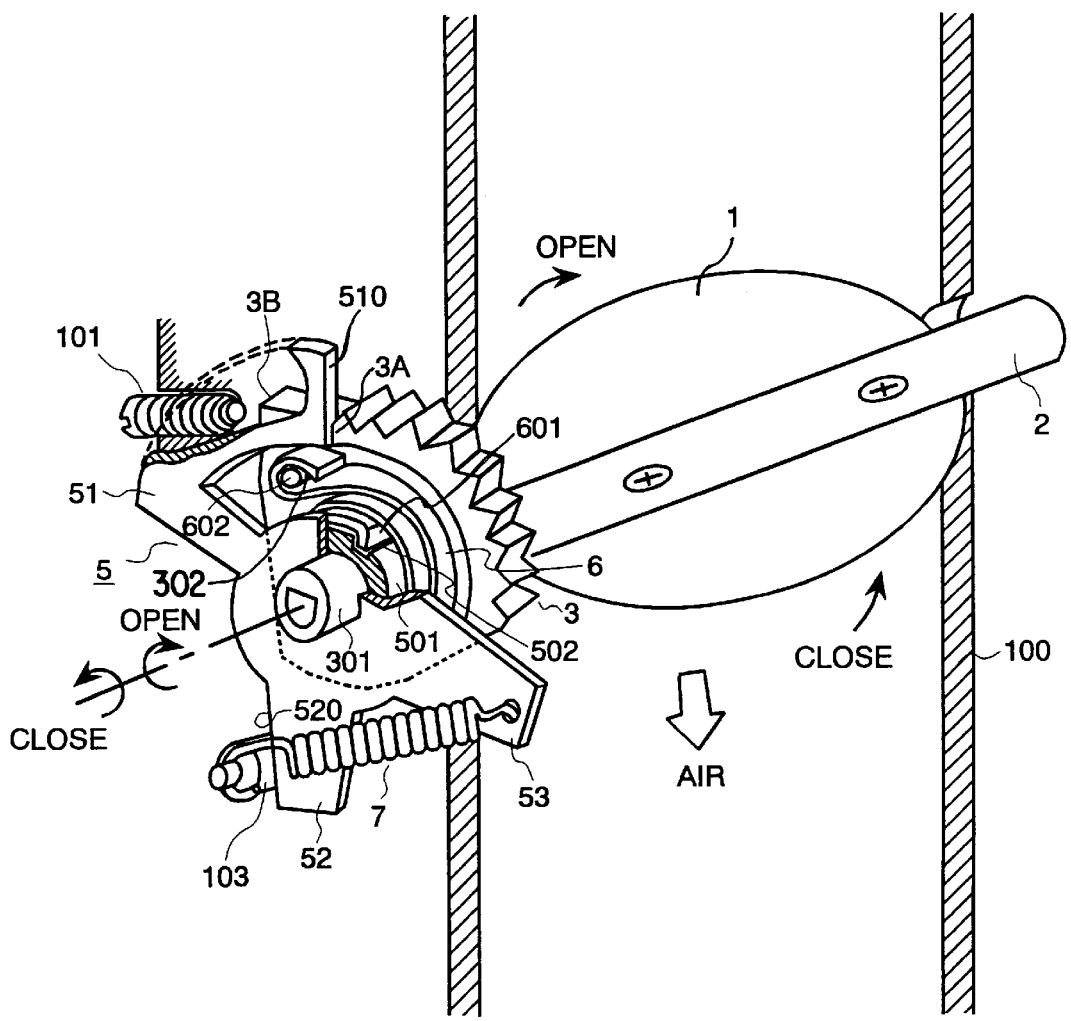
FIG. 8 is a perspective view showing the detailed structure of a part of the first embodiment.

Referring first to FIGS. 7 and 8, a basic construction and its operational principle of the first embodiment of the present invention will be explained.

In FIG. 7, air flowing through intake pipe 100 is adjusted by the throttle valve 1 which is fixed to the throttle valve shaft 2. Reduction gears 3 are attached at the end of the throttle shaft 2. Rotating torque of the throttle valve motor 4 is transmitted to the throttle valve 1 through the gears 3, whereby the opening of the throttle valve 1 can be adjusted.

The rotation of the motor 4 is controlled in proportion to the depression amount of the acceleration. pedal and therefore the opening of the throttle valve 1 is adjusted by the acceleration pedal.

Coupling lever 5 is supported by the throttle shaft 2, but can rotate independently therefrom. The lever 5 is energized toward the default stopper 103 by the default spring 7. The default spring 7 may be of an extension type or a compression type. If the throttle valve motor 4 is not fed or powered, there is no rotating force acting on the throttle shaft 2. Therefore, force of the default spring 7 acts on the throttle shaft 2 through the coupling end 3A of the movable member 3 fixed on the throttle valve 1, whereby the throttle valve 1 is opened at the default opening (4°~13°, for example) defined by the default stopper 103.

In order to further open the throttle valve 1 beyond the default position, the motor 4 must be energized so as to rotate the throttle valve 1 counterclockwise. -At this time, the throttle valve 1 rotates, extending the return spring 6 provided between the throttle valve 1 and the coupling lever 5 presently located at the default position. Thereafter, the coupling lever 5 is left behind the operation of the throttle valve 1.

On the other hand, in order to further close the throttle valve 1 beyond the default position, the motor 4 must be energized so as to rotate the throttle valve 1 clockwise. At this time, the throttle valve 1 pushes the coupling lever 5 at the default position by way of the coupling end 3A of the movable member 3 to rotate the coupling lever 5 clockwise. While extending the default spring 7, the coupling lever 5 rotates until the defining end 3B of the movable member 3 comes into contact with the full close stopper or the idle stopper.

Explanation will be made of the definition of the full close stopper and the idle stopper, or of the full close position and the idle opening.

A certain type of a throttle valve device is required to be kept at the minimum opening, in order that an engine continues to rotate without any operation of an acceleration pedal. With this minimum opening, the engine can take a minimum amount of air necessary for continuing to rotate at the idling revolutions without occurrence of engine stalling. For the convenience of explanation, this type is called a first type of a throttle valve device, here.

There is another type, i.e., a second type, of throttle valve device, in which an auxiliary air path bypasses a throttle valve in a main air path and the desired idling revolutions can be attained by the amount of air flowing through the auxiliary path. In this second type of a throttle valve device, the minimum opening of the throttle valve can be set substantially at 0°.

In the first type of the throttle valve device, the minimum opening is usually set at 1°~2°. Generally, this opening of 1°~2° is called "idle opening (or position)".

On the other hand, as in the second type of the throttle valve device, the opening of substantially 0° is called "full close opening (or position)".

Further, when taking the basic idea of the present invention into account, a third type of a throttle valve device is included, in which the first type and the second type as mentioned above are combined with each other. Namely, in the third type, the minimum opening of the throttle valve is set at 1°~2°, and in addition there is provided a path by-passing the throttle valve. The by-pass path is used when the number of idling revolutions can not be maintained even at the minimum opening.

As understood from the foregoing, a full close position (or stopper) or an idle position (or stopper) means a minimum opening position of a throttle valve under the usual control situation, and a stopper provided at such a position.

If there is no full close (or idle) stopper, a throttle valve can further rotate in the closing direction. However, this is not desirable, because the throttle valve may possibly stick in an inner wall of an intake pipe. To prevent this, therefore, a full close stopper is provided even in the second type of a throttle valve device with a by-pass path.

Incidentally, the default stopper for securing the minimum safety is provided at the position which is further progressed by 4°~13° in the opening direction of the throttle valve.

The basic construction embodying the operational principle of the present invention as shown in FIG. 7 will be described, referring to FIG. 8.

The intake pipe (manifold) 100 rotatably supports the throttle valve shaft 2, to which the throttle valve 1 is attached. The throttle valve 1 rotates together with the throttle shaft 2 to vary the effective cross-sectional area of the intake manifold, whereby the amount of air sucked can be adjusted.

The throttle shaft 2 goes through the wall of the manifold 100 and extends outside, at end of which a gear is provided as the movable member 3. The gear-side sleeve 301 is formed in the center of the gear 3 as a unitary body. Around the center of the sleeve 301, a hole is formed having the cross-sectional form which fits a notched portion for detent provided on the end portion of the throttle shaft 2. With such a construction, the throttle shaft 2 and the gear 3 always rotate together.

The coupling lever 5 is rotatably provided on the outer periphery of the sleeve 301. The center of the coupling lever 5 is fixed to the lever-side sleeve 501, in which the gear-side sleeve 301 is rotatably inserted.

The gear 3 is made from sintered alloy in a sectorial form, on the outer arced periphery of which gear teeth are formed. A body of the gear 3 extends in the axial direction, and a circular flat depressed space or room is formed having the depth in the direction of the thickness of the gear body.

In the circular flat space or room defined in the gear body, the return spring 6 in the spiral form is accommodated. The end 601 of the return spring 6 is hooked at the slit 502 which is cut on the outer periphery of the lever-side sleeve 501.

A supporting pin 302 projects from the gear 3. The return spring 6 is hooked at one end 602 of the supporting pin 302.

The coupling lever 5 has three arms 51, 52, 53 extending radially. The arm 51 is provided with the surface 510 which receives the contacting end 3A formed on the periphery of the gear 3. The arm 52 is provided with the surface 520 which comes into contact with the default stopper 103 formed on the throttle valve body. The arm 53 holds one end of the spiral default spring 7. The other end of the default spring 7 is hooked at a supporting pin which also serves as the default stopper 103.

One of both side ends of the gear 3 in the sectorial form serves as the defining end 3B, which comes into contact with the full close stopper (or idle stopper) 101 provided at the full close position (or idle position) of the throttle valve. The full close stopper 101 is a screw adjustably screwed in the throttle valve body.

In the following, description will be made of the operation of the first embodiment constructed as above.

When the driving motor stops because of engine stall or any fault of the motor control circuit, contact of the surface 520 of the arm 52 is with the default stopper (pin) 103 is maintained by the force of the default spring 7 acting between the arm 53 of the coupling lever 5 and the default pin 103. At this time, the force of the return spring 6 does not act on the default spring 7 at all, which is one of the major differences from the conventional device.

When the engine is prepared to start and the throttle valve motor is powered or fed, the throttle valve 1 is required to keep the idle opening in order for the engine to continue the operation at the idling rotational speed. When the motor 4 starts the rotation, it rotates the throttle shaft 2 through the reduction gear 3 counterclockwise.

At this time, the coupling lever 5 rotates together counterclockwise, because the contacting end 3A comes into contact with the surface 510 formed on the arm 51 of the coupling lever 5. This rotational movement continues, until the defining end 3B located at the top end in the rotating direction of the movable member (gear) 3 comes into contact with the full close stopper 101.

In this manner, the throttle valve motor 4 rotates the throttle shaft 2 from the default position to the full close (or idle) position, against the force of the default spring 7. The motor 4 has to continue to produce torque counterclockwise to keep the throttle valve 1 at the full close opening, until an acceleration pedal is depressed and an instruction for a predetermined opening is issued.

When the acceleration pedal is depressed and the automobile is ready to start, the motor 4 receives an instruction for clockwise rotation (opening direction- of the throttle valve 1) in proportion to the depressed amount of the pedal. Torque produced by the motor is large enough to rotate the throttle shaft 2 clockwise and open the throttle valve at the full open position. The mechanism of this part can be constructed in such a manner that the tensile force of the default spring 7 is cooperatively added to the rotational movement by the motor 4.

When the throttle valve 1 is opened at the default position, the coupling lever 5, which has rotated together, is prevented from further rotation. Accordingly, in the direction of the opening operation beyond that position, only the throttle shaft 2 rotates clockwise to open the throttle valve 1.

At this time, the inner end 601 of the return spring 6 can not rotate because it is held by the sleeve 501 of the coupling lever 5 which is stopped at the default position. Only the outer end 602 of the return spring 6 rotates together with the gear 3 clockwise, since the outer end 602 is held by the pin 302 provided on the gear 3. Thereby, as the diameter of the spring 6 increases, the spring 6 can store the energy to rotate the shaft 2 counterclockwise.

If the acceleration pedal continues to be constantly depressed by a certain amount, the motor 4 continues to give the force corresponding to the stored energy to the throttle shaft 2 through the gear 3.

If, however, the acceleration pedal is released, it is stopped to feed the motor 4. As a result, the force stored in the return spring 6 acts on the throttle shaft 2 through the gear 3 and the throttle valve 1 rotates counterclockwise (in the closing direction).

At this time, the inertia caused by the mass of a rotor of the motor 4 is amplified by the gear 3 to act on the throttle shaft 2 in the closing direction of the throttle valve 1. In addition, the air flow blowing against the throttle valve 1 effects force in the closing direction thereof. When the contact end 3A of the gear 3 comes into contact with the surface 510 of the arm 51 of the coupling lever 5 staying at the default position, the coupling lever S rotates together with the gear 3 counterclockwise. Force caused by the default spring 7 hardly becomes the resistance against the counterclockwise rotation of the gear 3. This rotation stops when the defining end 3B contacts the full close stopper.

It is, of course, that the motor. 4 is powered or fed to produce torque for rotating the throttle shaft 2 clockwise (in the closing direction) after the throttle valve 1 passes through the default position.

The returning force (counterclockwise force) of the is spring 6 becomes substantially zero when the throttle valve 1 passes through the default position. Since, however, the throttle shaft 2 receives force counterclockwise (in the closing direction) because of the inertia of the motor rotor and the torque produced thereby, the throttle shaft 2 continues to rotate until the full close position.

If the opening of the throttle valve 1 is large, the inertia of the motor rotor, which causes the throttle shaft 2 to rotate in the closing direction, becomes equally large. Conversely, if the throttle valve 1 is opened slightly, the energy stored in the return spring 6 is small and therefore the inertia of the motor rotor is also small. At this time, the throttle shaft 2 rotates until the full close position by the motor torque. The inertia of the motor rotor operates also in the case where the motor 4 and/or the control circuit thereof have a fault and torque produced by the motor 4 disappears.

However, the motor 4 can not produce torque in the closing direction, even after the default position is passed through. Therefore, even if the throttle shaft 2 once passed through the default position, it is finally returned by the tensile force of the default spring 7. This is the reason why the minimum safety can be attained with the default position, since the default opening is larger than the full close opening. The first embodiment will be explained below, referring to FIGS. 1 to 6.

Figure 9:
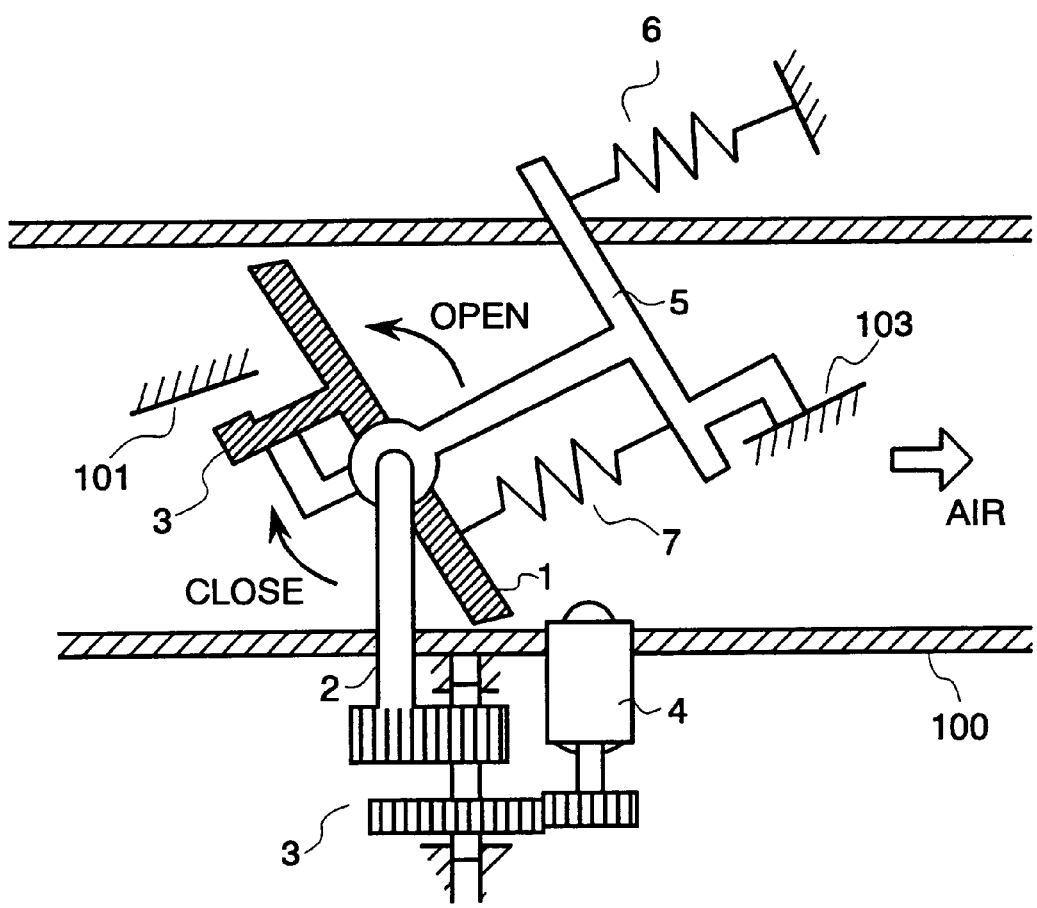
FIG. 9 is a schematic diagram for explaining the operation of an electronically controlled motor-driven throttle valve device according to a second embodiment of the present invention.

Referring first to FIG. 9, however, description will be made of the principle of the second embodiment.

In FIG. 9, the throttle valve 1 is attached to the throttle valve shaft 2 which is rotated by the throttle valve motor 4 clockwise or counterclockwise through the reduction gear 3 in the same manner as in FIG. 7. The coupling lever 5 is arranged rotatably in relation to the throttle shaft 2 which is also the same as in FIG. 7. The following are the differences from FIG. 7:

(1) the throttle valve 1 is closed at the default position by the return spring 6 through the coupling lever 5; and (2) the default spring 7 is provided between the throttle valve 1 and the coupling lever 5.

The above structural differences cause the following operational differences:

(a) from the default position to the full close stopper, the throttle shaft 2 rotates independently, separated from the coupling lever 5. At this time, force of the default spring 7 acts directly on the throttle shaft 2; and (b) in the opening direction beyond the default position, the throttle shaft 2 rotates together with the coupling lever 5. At this time, force of the return spring 6 acts on the throttle shaft 2 through the coupling lever 5.

Figure 10:
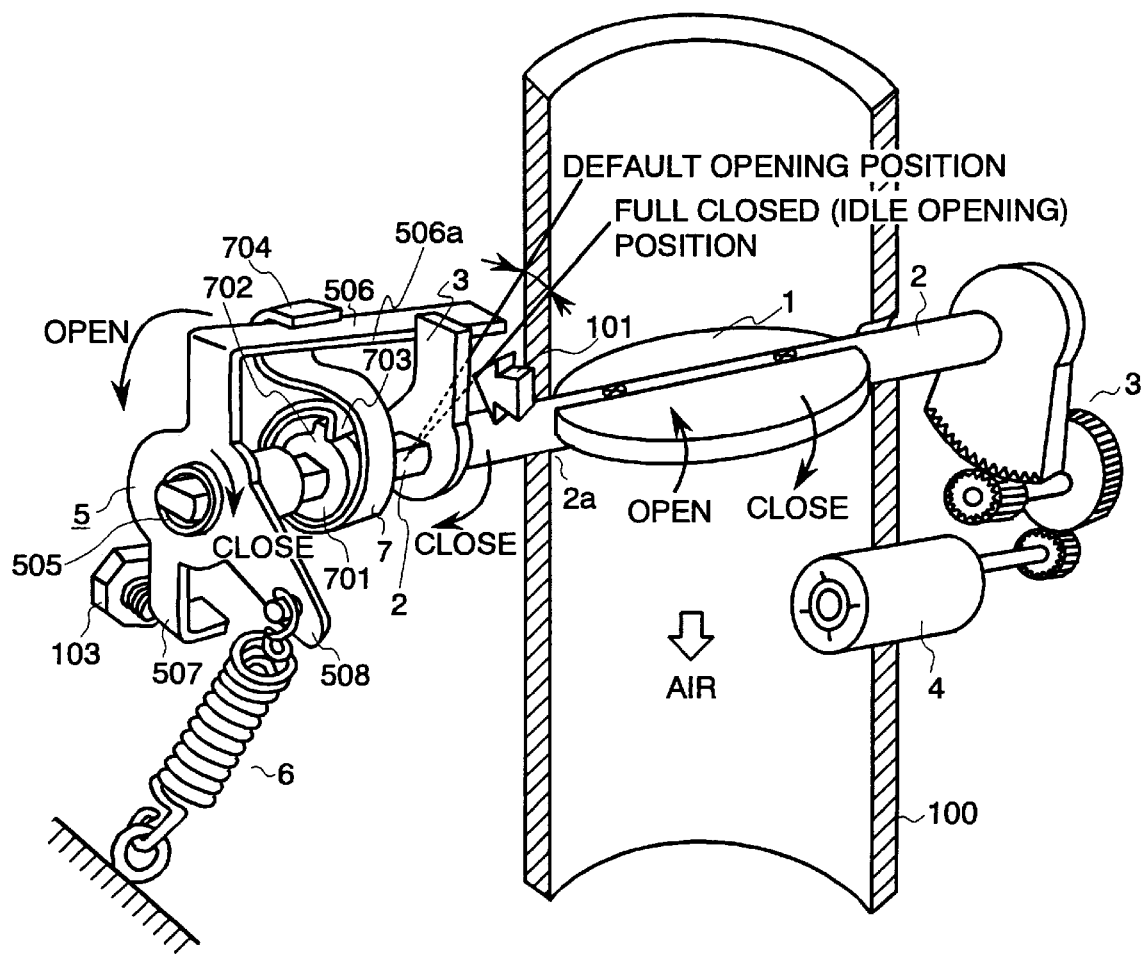
FIG. 10 is a perspective view showing the detailed structure of the second embodiment.

FIG. 10 shows a basic construction of the second embodiment of the present invention.

Rotating torque of the throttle valve motor 4 is amplified by the reduction gear 3 and transmitted to the throttle shaft 2 rotatably supported by the bearing 2 of the intake manifold 100. Accordingly, the throttle shaft 2 rotates clockwise or counterclockwise in accordance with the rotational direction of the motor 4, whereby the throttle valve 1 closes or opens to adjust the effective cross-section of the intake air path.

The partially flattened detent portion is formed on the throttle shaft 2 at the end portion, which is opposite to the gear 3 with respect to the throttle valve 1. The throttle lever 3 as the movable member is provided with a hole fitting the flattened portion of the throttle shaft 2. The throttle shaft 2 is inserted through the hole, whereby the throttle lever 3 is attached to the throttle shaft 2.

In the same manner, the fixed sleeve 701 is also attached to the throttle shaft 2.

The coupling lever 5 is rotatably supported by the throttle shaft 2 through the sleeve 505. The lever 5 is provided with the arm 506 formed as a unitary body which has the surface 506a coming into contact with the throttle lever 3 when the coupling lever 5 rotates clockwise.

The default spring 7 is formed by a spiral spring, the outer end 704 of which is hooked at the arm 506 of the coupling lever 5 (hence, the outer end 704 will be called an outer hook end, hereinafter). The spiral default spring 7 starts from the inner end 703 and then is wound up by a few turns counterclockwise, viewed from the left-hand side of the figure, and finally reaches the outer hook end 704.

When the coupling lever 5 rotates counterclockwise, the arm 506 is received by the outer hook end 704. The inner end 703 of the default spring 7 is stopped by the projection 702 which is projected radially from the outer periphery of the fixed sleeve 701.

The coupling lever 5 has the second arm 507 which comes into contact with the default stopper 103 at the default position when the coupling lever 5 rotates clockwise. The default stopper 103 is adjustably screwed directly into the intake manifold 100 or into an appropriate member attached thereat. Further, the coupling lever 5 has the third arm 508, at which one end of a coil spring serving as the return spring. 6 is hooked. The other end of the return spring 6 is hooked at the intake manifold 100 or directly into the intake manifold 100.

Further, the throttle lever 3 is arranged to come into contact with the full close stopper 101 provided at the full close position of the throttle valve 1 when it rotates in the closing direction.

In the following, description will be made of the operation of the above-described second embodiment.

When an engine is out of operation and hence a throttle valve motor 4 is not fed, the coupling lever 5 is kept by the return spring 6 at the position of the default stopper 103. This situation is held, since neither force in the closing direction nor force in the opening direction acts on the throttle shaft 2.

When the engine is started, but an acceleration pedal is not depressed, a control system requires the throttle valve 1 to be in the full close opening, taking the operational condition of the engine into consideration. Therefore, the throttle valve motor 4 is fed to rotate the throttle shaft 2 clockwise, i.e., in the direction of closing the throttle valve 1.

When the throttle shaft 2 rotates in this direction, the throttle lever 3 separates from the arm 506, because the coupling lever. S is stopped at the default position. Since the outer hook end 704 of the default spring 7 is supported by the arm 506, on one hand, and the inner end 703 thereof rotates clockwise together with the sleeve 701, as the throttle shaft 2 rotates, on the other hand, the. default spring 7 is wound up tightly to store energy.

The throttle valve 1 is needed to be kept at the full close position, until the acceleration pedal is depressed. Through that duration, therefore, the throttle valve motor 4 has to continuously apply counter force corresponding to the energy stored in the default spring 7, to the throttle shaft 2. The throttle lever 3 continues to come into contact with the full close stopper 101 through the entire duration.

When the acceleration pedal is depressed and the automobile begins to run, the throttle valve 1 is controlled in response to the amount of the acceleration pedal depression. At this time, the polarity of feeding the throttle valve motor 4 is switched over, whereby the motor 4 produces torque for rotating the throttle shaft 2 counterclockwise.

Until the default position, the energy stored in the default spring 7 acts on the throttle shaft 2 in the same direction and aids the throttle shaft 2 to rotate counterclockwise. When the throttle shaft 2 rotates to reach the default position, the throttle lever 3 comes into contact with the surface 506a of the arm 506 of the coupling lever 5. If the throttle shaft 2 further rotates counterclockwise, the coupling lever 5 rotates together.

In such a situation, the return spring 6 hooked at the arm 508 of the coupling lever 5 is extended, whereby the spring 6 stores energy.

If the acceleration pedal is released, feeding of the throttle valve motor 4 is stopped. Only the tensile force stored in the return spring 6 acts on the throttle shaft 2 through the arm 506 of the coupling lever 5 and the throttle lever 3, whereby the throttle shaft 2 rotates counterclockwise, i.e., in the closing direction.

At this time, in the same manner as in the first embodiment, inertia force caused by mass of the motor rotor is amplified by the gear 3 and acts on the throttle shaft 2 in the closing direction. When the default stopper 103 at the default position receives the arm 507 of the coupling lever 5, the rotation of the coupling lever 5 stops there. Thereafter, the throttle shaft 2 solely rotates in the closing direction by the inertia force of the motor rotor. During this operation, the default spring 7 is wound up tightly to store energy.

After the throttle shaft. 2 passes through the default position, the throttle valve motor 4 is again fed whereby torque of the motor 4 is added to rotate the throttle shaft 2 in the closing direction.

Also in this second embodiment, the clockwise returning force of the spring 6 no longer acts on the throttle shaft 2 at the default position. Therefore, the throttle shaft 2 is rotated by the inertia force of the motor rotor and the torque produced by the motor 4 until the full close position.

As already described with respect to the first embodiment, also in this second embodiment, the larger the throttle valve opening is, the larger the inertia force of the motor rotor is. If the throttle shaft 2 rotates only slightly from the default position, energy stored in the return spring 6 is small, too, and hence the inertia force of the motor rotor is also small. At this time, as in the first embodiment, the throttle shaft 2 is rotated by torque produced by the motor 4 clockwise until the full close position.

Even in the case where the throttle valve motor 4 can not be fed because of any trouble, the inertia force of the motor rotor is applied to the throttle shaft 2. Since, however, the motor 4 does not produce torque in the closing is direction after the throttle shaft 2 passes through the default position, the throttle shaft 2 is finally returned to the default position by the energy stored in the default spring 7.

Further, in both the first and the second embodiments, when the throttle shaft 2 is positioned at the closing side with respect to the default position, feeding of the throttle valve motor 4 is interrupted because of any fault condition, the throttle shaft 2 is rotated to the default position by the energy stored in the default spring 7.

Figure 11:
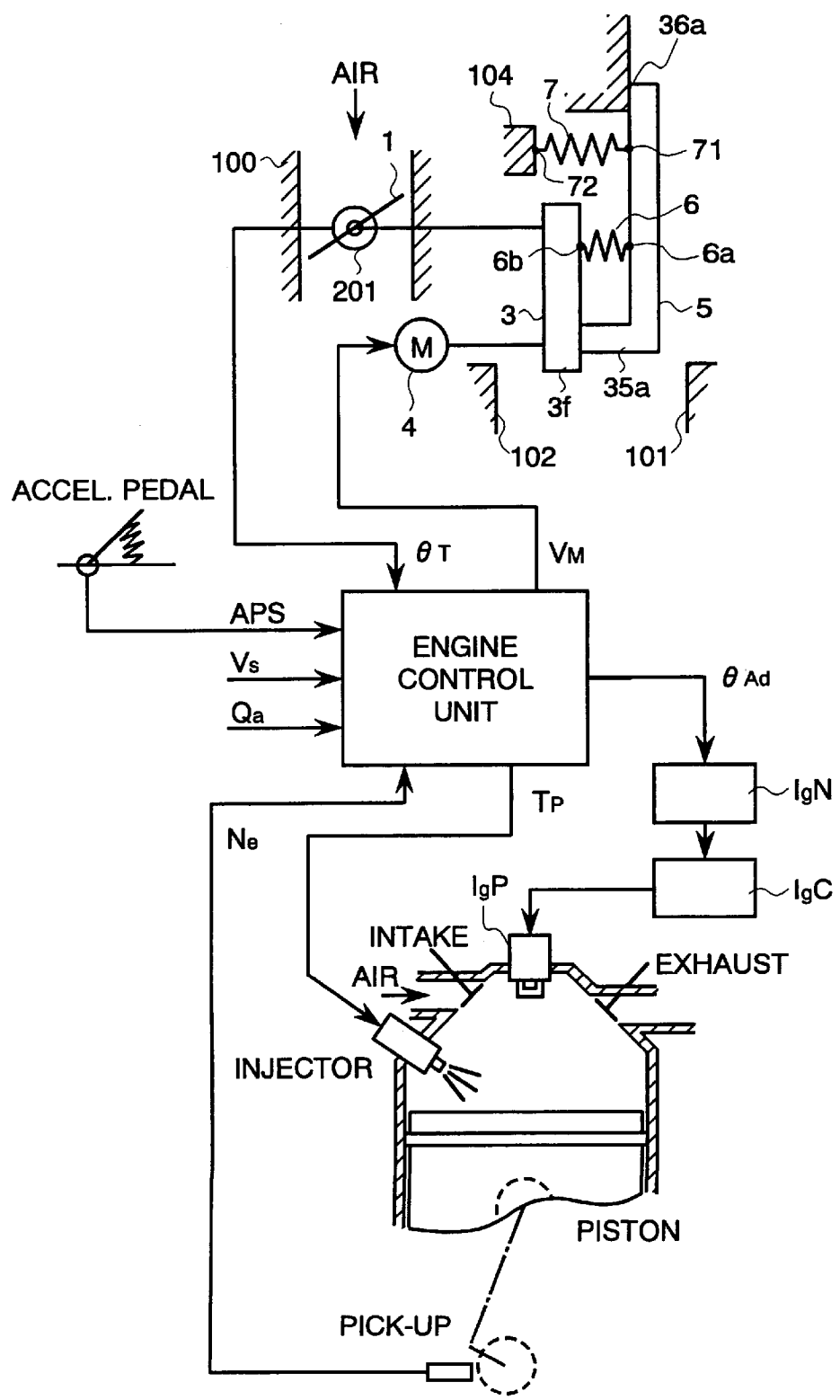
FIG. 11 is a schematic diagram showing an automobile control system which adopts an electronic control throttle valve according to the present invention.

As shown in FIGS. 11 and 12, the engine control unit ECU receives the acceleration pedal depression amount signal APS and the throttle valve opening signal $\theta_T$ from the throttle sensor 201 to thereby calculate the throttle valve motor signal $V_M$. The throttle valve motor 4 is controlled in accordance with the signal $V_M$ and adjusts the opening of the throttle valve 1.

It is discriminated at step 120 that an automobile falls into the emergency traveling condition, if the following conditions occur: i.e., the throttle valve opening signal $\theta_T$ does not reach a predetermined value, although the acceleration pedal depression amount signal APS changes; and the throttle valve motor 4 is not fed normally.

If the emergency traveling, condition is discriminated in Step 120 to occur, the warning lamp is on at step 125 and the fuel supply signal $T_P$ for emergency traveling is calculated and output at step 126. At step 127, the ignition timing $\theta_{Ad}$ is compensated so as to be delayed, compared with that in the normal operation.

When no depression of the acceleration pedal occurs and the speed $V_S$ of the automobile is zero, the engine has to be kept at the number of rotation for idling. Since, however, the throttle valve opening is as large as 4°~13° under the emergency traveling condition, the engine rotational speed $N_e$ becomes much higher than the usual idling revolutions.

To prevent this and keep a predetermined number of revolutions for idling, in this embodiment, the number $N_e$ of revolutions of the engine is compared with the predetermined number of revolutions for idling, and the amount of fuel to be injected is decreased so that the former follows the latter. Further, the ignition timing is delayed so as to be at the ignition timing in the operation for low load and low speed.

In FIG. 12, if it is discriminated that no emergency traveling occurs, the engine control unit ECU, at step 121, calculates the basic fuel injection pulse $T_P$ on the basis of the intake air amount $Q_a$ and the number of rotation $N_e$ of the engine, and at step 122, calculates the ignition timing $\theta_{Ad}$ corresponding to the number of rotation $N_e$ of the engine, and finally at steps 123, 124, outputs control signals to an fuel injector and a ignition control circuit IgN, respectively.

Receiving these signals, the injector injects a predetermined amount of fuel into cylinders and the ignition coil IgC produces spark at spark plugs IgP. Further, in FIG. 12, the number of revolution pick-up $N_eP$ is actuated by a crank shaft of the engine and detects the number of revolutions $N_e$ of the engine.

Returning to FIGS. 1 to 6, description will be made of the more detailed structure of the first embodiment.

FIGS. 1A to 1C are explanatory diagrams schematically showing the operational principle of an electronic control throttle valve according to the first embodiment of the present invention.

As shown in the drawing, the throttle valve 1 is attached to the throttle valve shaft 2 which is rotatably supported by the body 100 of the throttle valve device. One end of the throttle shaft 2 is attached to the movable member 3 which is mainly composed of gears. The throttle valve 1 is opened or closed by the throttle valve motor 4 through the movable member 3.

The contacting member 5 is formed by a lever made of thin plate, and when the movable member 3 moves in the direction of closing the throttle valve 1, the member 5 comes into contact with the member 3. A spring 6 is provided between the members 3 and 5 and energizes both the members in the opposite directions. Further, the spring 7 is provided between the contacting member 5 and the body of the throttle valve device and energizes the member 5 in the direction of opening the throttle valve 1.

On the body of the throttle valve device, the full close stopper 101 defines the position of full close of the throttle valve 1, the full open stopper 102 defines the position of full open of the throttle valve 1, and the default stopper 103 defines a predetermined small opening of the throttle valve 1, which allows an automobile travel at the speed for the emergency travel, even if the throttle valve motor 4 has a trouble.

With this construction, during the usual travel of an automobile, the throttle valve 1 and the contacting member 3 conduct the opening and closing operation in the range between the full close position (as shown in FIG. 1A) and. the full open position (as shown in FIG. 1C). In the event of failure of the throttle valve motor 4 or during no operation of the engine, the throttle valve 1 and the contacting member 5 are held by the springs 6, 7 at the position of the default stopper 103 (as shown in FIG. 1B).

Thereby, even in the event of failure of the throttle valve motor 4, it is possible to keep a necessary air flow rate to let the automobile travel to a repair shop. In. addition, since the throttle valve 1 is slightly opened from the full close position (default position) during no operation of the engine, it is possible to improve restarting capability of the engine and to prevent sticking of the throttle valve.

As for the spring load applied to the throttle valve motor 4, only the spring 7 is active in the range between the full close position and the default position, and only the spring 6 is active in the range between the default. position and the full open position. Force caused by the respective springs 6, 7 acts on the motor 4 separately.

As a result, the difference in the spring characteristics and the resistance against the sliding movement are never added to each other, whereby the load applied to the throttle valve motor 4 can be determined by. the characteristic of one of the springs. In addition, each of the spring 6, 7 can be made small in size and the load of the motor 4 can be reduced, because it only operates in the narrow range of operation.

A throttle valve device according to the first embodiment of the present invention will be explained, referring to FIG. 2 to FIGS. 6A to 6D.

In this embodiment, the movable member 3 is a sectorial gear with the hollow cylindrical sleeve 3*b* in its center. A space or room for accommodating the spring 6 is formed in a body portion of the gear, on the outer-side. periphery of which body gear portion (gear teeth) 3*h* is formed. Driving torque of the throttle valve motor 4 is transmitted from output gear 11 to the throttle shaft 2 through the intermediate gear 12 and the gear portion 3*h* of the movable member 3, with the rotational speed reduced (i.e., with the torque amplified).

Further, the movable member 3 and the contacting member 5 are energized by the spring 6 in opposite directions, and the contacting member 5 and the gear portion 3*h* rotate together after the arm 35 of the former and the end surface 3*f* of the later establish contact with each other.

The spiral spring 6 is accommodated in the space or room formed in the movable member 3. The outer hook portion 6*a* of the spring 6 is hooked at the hooking portion 3*a* provided on the movable member 3. In this embodiment, the low friction coefficient member 3*c* made of nylon resin is arranged between the inner surface of the movable member 3 and the spring 6 to reduce the frictional resistance caused by the sliding movement.

The projection 3*d* is engaged with the dent 3*e* formed inside the outer-side periphery of the gear portion 3*h* to serve as a slip stopper. The plane plate portion 3*i* serves to reduce the friction between the end surface of the spring 6 and the plane plate portion 3*j* of the body portion of the movable member 3.

The inner hook portion 6*b* of the spiral spring 6 is hooked at the slit 5*d* provided in the bearing member 5*a* which is formed as a unitary body with the contacting lever 5. In the embodiment shown, the bearing member 5*a* is made of metal, and its body portion is inserted in the inner circular space defined by the spiral spring 6.

The projecting portion is formed at the central portion thereof, which is inserted in a central hole provided in the contacting lever 5. The projecting portion is folded toward the outside, whereby the lever 5 is fixed by caulking to the end surface of the body portion of the bearing member 5*a*.

The contacting lever 5 is rotatably supported by the hollow sleeve 3*b* formed as a unitary body with the movable member 3, in which the inner peripheral wall of the bearing member 5*a* serves as a bearing. In this embodiment, the frictional resistance produced by sliding movement is reduced by press-fitting the cylindrical sleeve 5*c* made of metal into the bearing member 5*a*, in which the sleeve 5*c* is coated with low friction coefficient material such as nylon or Teflon resin.

The contacting lever 5 is made of thin metal plate, which has the three arms 35, 36, 37, each extending radially. The arm 35 provides the contacting portion, on which the contacting lever S and the movable member 3 contact with each other. The arm 36 serves to keep the throttle valve 1 at a predetermined small opening by its end surface 36*a* coming into contact with the stopper 103 provided on the throttle valve body, when the throttle valve motor 4 produces no torque. The arm 37 has the grommet 5*d* at its top portion, at which the spring 7 is hooked by the hook 71 formed on one end thereof.

The hook 72 provided at the other end of the spring 7 is hooked at the projection 104 formed on the throttle valve body. Thereby, the movable member 3 and the contacting lever 5 can be formed as a subassembly in a unitary body, with the result that both the members are easily assembled in the throttle valve body.

Further, the movable member 3 and the contacting lever 5 move together when the throttle valve 1 rotates between the full close position and the default position, and hence no frictional resistance occurs in the bearing portion of the contacting lever 5. As a result, the characteristic in controlling the opening, especially in the small angle, can be much improved and the controllability for idling operation is also improved.

In this embodiment in which the spring 7 operable during the small opening is formed by an extension spring, the frictional resistance of the sliding movement of the spring itself can be reduced when it operates. Further, since it is not necessary to arrange the spring around the entire periphery of the throttle valve 2, different from that of a torsion spring, the spring can be arranged at a position juxtaposed with the intermediate gear 12, and accordingly the throttle valve body size can be reduced.

Furthermore, in this embodiment, the full close stopper 101 is a metallic pin adjustably screwed into a gear cover integrated in the throttle valve body. The full open stopper 102 is a stepped portion formed on the throttle valve body, and the default stopper 103 is formed by a projection integrally provided on the throttle valve body.

The end portion 3*k* of the gear portion 3*h* is brought into contact with the stopper 101 at the full close position of the throttle valve 1. The end portion 3*g* of the gear portion 3*h* is brought into contact with the stopper 102 at the full open position of the throttle valve 1. The end surface 30*a* of the arm 36 is brought into contact with the stopper 103 at a predetermined small opening position.

In addition, the rotational angle sensor 20 for detection of the throttle valve opening is arranged between the movable member 3 and the throttle valve body. The sensor 20 can be located between the resin mold housing 21 and the wall of the throttle valve body, whereby the width of the sensor 20 can be reduced overall, and a detecting portion can be protected from abrasion powder produced from the gear etc.

The contact lever 5 can be fixed at the bearing member 5*a* by resin-molding. Since thereby the bearing member itself can also be formed with resin, the sleeve 5*c* can be omitted. The sleeve 5*c* may be integrally formed of resin such as nylon. In this embodiment, the spring 6 may be accommodated inside the cover 202 as a so-called return spring. The spring 7 can also be accommodated in the cover 202. The rotation angle sensor 20 can be protected from moisture by the double cover structure composed of the cover 202 and the housing 21.

As described above, according to the first and the second embodiments of the present invention, a small-sized throttle valve device can be realized and can maintain a desirable engine rotational speed even in a-case of a fault of a throttle valve motor while allowing an automobile to travel at a desired speed for emergency traveling. With the structure of the present invention, accurate control of the throttle valve can be performed especially during the small opening of the throttle valve.

In the above-described embodiments, the two kinds of springs (the default spring and the return spring) are operably influenced with each other through the coupling lever, in which one of the springs is active for the closing operation of the throttle valve and the other for the opening operation thereof. As a result, there exists no operational range in which force of both the springs acts together at the same time, which makes it possible to reduce the variation in the applied load and the frictional resistance of sliding movement.

Further, the range in which the respective springs must operate is narrow, since the range corresponds to only a part of the full operation range of the throttle valve. Therefore, the spring constant can be made large without increasing the maximum load applied to the throttle valve motor, with the result that the spring size can be reduced (i.e., reduction in the number of turns).

On the contrary, if the spring constant is not changed, the maximum load applied to the motor can be reduced, whereby the size of the throttle valve motor can be reduced. If, however, the reduction ratio is reduced, the size of the gear can be reduced.

Further, in the first embodiment, because an extension spring having a small interwire friction (a small sliding resistance) is employed as a default spring, the control accuracy in the small opening range is improved.

Moreover, since the extension spring is not required to be arranged around the entire periphery of the throttle shaft, the size of the throttle valve body can be reduced. Furthermore, by arranging a guide portion of the contacting member on the side of the movable member, a sliding portion of the contacting member can be omitted in the small opening range, and accordingly the control accuracy in the small opening range can be improved.

Further, by making the shape of the movable member nearly cylindrical, a return spring can be accommodated on the inside of the cylindrical portion, and teeth of the gear operably engaged with the throttle valve motor can be formed on the outside of the cylindrical portion, whereby the size of the throttle valve body can be reduced.

Furthermore, by employing a spiral spring as the return spring which is operable in the range of the large opening of the throttle valve, and by hooking the outer hook end of the spiral spring at the movable member and the inner end thereof at the contacting member, the control accuracy in the range of the large opening can be improved. The foregoing is achieved because the movable member can serve as an outer radial guide of the spiral spring, and the frictional resistance of slide caused by the relative movement of the outer periphery of the spiral spring and the outer radial guide can be suppressed as much as possible.

Moreover, by integrating the guide portion of the contacting member and the movable member together, the contacting member, the movable member and the return spring can be formed as a subassembly in a unitary body, whereby the throttle valve device can be easily assembled.

If at least one of surfaces of a case accommodating the angle sensor is formed by a part of a main body of the throttle valve device and the remaining surfaces thereof are formed integratedly with a housing of the angle sensor, the throttle valve body can be made thinner, in addition to the protection of the detecting portion, compared with the structure that the entire surfaces are covered by the housing.

Further, since the angle sensor can be arranged even at a position near gears which more or less produce abrasion powder, a throttle valve device size can be made small without losing any reliability.

As described above, the present invention provides a small-sized throttle valve device capable of performing the highly accurate control capable of performing traveling in emergency since the desirable rotational speed is kept even in the event of failure of a throttle valve driving motor.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A throttle valve control device for a throttle valve which controls an amount of intake air of an internal combustion engine, comprising:

a main body of the throttle valve device in which an intake air path is formed;

a throttle shaft which is rotatably supported by the main body of the throttle valve device, the throttle valve being disposed in the intake air path as well as being operatively secured to the throttle shaft;

an electric motor which drives the throttle valve;

a gear mechanism which transmits a rotating torque produced by the electric motor to the throttle shaft;

a rotating angle sensor for detecting an opening angle of the throttle valve;

a default spring arranged to energize the throttle valve at a closing side from a predetermined opened opening angle position of the throttle valve toward the predetermined opened opening angle position;

a return spring arranged to energize the throttle valve at an opening side from the predetermined opened opening angle position of the throttle valve toward the predetermined opened opening angle position; and a cover for the main body of the throttle valve device at one end portion side of the throttle shaft, wherein the gear mechanism, the rotating angle sensor, the default spring and the return spring are accommodated between the cover and the main body of the throttle valve device.

2. A throttle valve control device according to claim 1, wherein the rotating angle sensor is isolated from the gear mechanism through a partition member.

* * * * *